United States Patent Office 3,361,851
Patented Jan. 2, 1968

3,361,851
BLEND OF POLYOLEFIN AND POLY-
PHENYLENE OXIDE
Alastair C. Gowan, Pittsfield, Mass., assignor to General
Electric Company, a corporation of New York
No Drawing. Filed Jan. 5, 1965, Ser. No. 423,577
6 Claims. (Cl. 260—897)

This invention relates to a method for improving the impact strength and resistance to cracking in aggressive solvents of a polyphenylene oxide without substantially impairing other physical properties and to novel polyphenylene oxide compositions containing polyolefins.

The polyphenylene oxides are disclosed in U.S. Patent Ser. No. 3,306,875 of Allan S. Hay, the contents of which are incorporated herein by reference. They have excellent properties, and in particular, outstanding mechanical and electrical properties over a wide temperature range.

However, they have been characterized by poor impact strength as measured by the notched Izod test, and only a fair resistance to cracking in aggressive solvents. It has now been unexpectedly found that these two characteristics can be substantially improved by dispersing a small quantity of a polyolefin in the polyphenylene oxide.

In addition, the polyolefins acts as a plasticizer for the polyphenylene oxide resulting in polymers more readily fabricated by extrusion and molding.

Accordingly, an object of this invention is to provide a polyphenylene oxide composition containing a polyolefin.

Other objects and advantages of the present invention will be in part apparent and in part printed out in the description which follows.

The polyphenylene oxides may be represented by the following formula:

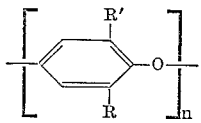

wherein R is a monovalent substituent selected from the group consisting of hydrogen, hydrocarbon radicals free of a tertiary α-carbon atom, halohydrocarbon radicals having at least two carbon atoms between the halogen atom and phenol nucleus and being free of a tertiary α-carbon atom, hydrocarbonoxy radicals free of a tertiary α-carbon atoms, and halohydrocarbonoxy radicals having at least two carbon atoms between the halogen atom and phenol nucleus and being free of a tertiary α-carbon atom. R′ is the same as R and, in addition, halogen; and $n$ may represent any whole integer greater than 100.

Typical examples of the monovalent hydrocarbon radicals that R and R′ may be in the above formula are: alkyl, including cycloalkyl, e.g., methyl, ethyl, propyl, butyl, secondary butyl, cyclobutyl, amyl, cyclopentyl, hexyl, cyclohexyl, methylcyclohexyl, ethylcyclohexyl, octyl, decyl, octodecyl, etc.; alkenyl, including cycloalkenyl, e.g., vinyl, allyl, butenyl, cyclobutenyl, isopentenyl, cyclopentenyl, linolyl, etc.; alkynyl, e.g., propargyl, etc.; aryl, including alkaryl, e.g., phenyl, tolyl, ethylphenyl, xylyl, naphthyl, methylnaphthyl, etc.; aralkyl, e.g., benzyl, phenylethyl, phenylpropyl, tolylethyl, etc. The monovalent halohydrocarbon radicals may be the same as the hydrocarbon radicals, as outlined above, except methyl and α-haloalkyl radicals, wherein one or more of the hydrogen atoms are replaced by halogen, to produce halohydrocarbon radicals having at least two carbon atoms between the halogen and the free valence, examples of which are: 2-chloroethyl, 2-bromoethyl, 2-fluoroethyl, 2,2-dichloroethyl, 2- and 3-bromopropyl, 2,2-difluoro-3-iodopropyl, 2-, 3-, and 4-bromobutyl, 2-, 3-, 4-, and 5-fluoroamyl, 2-chlorovinyl, 2- and 3-bromoallyl, 2- and 3- fluoropropargyl, mono-, di-, tri-, tetra-, and pentachlorophenyl, mono-, di-, tri-, and tetrabromotolyl, chloroethylphenyl, ethylchlorophenyl, fluoroxylyl, chloronaphthyl, bromobenzyl, iodophenylethyl, phenylchloroethyl, bromotolylethyl, etc.

Typical examples of the monovalent hydrocarbonoxy radicals are: methoxy, ethoxy, propoxy, isopropoxy, butoxy, secondary butoxy, tertiary butoxy, amoxy, hexoxy, octoxy, decoxy, vinoxy, alloxy, butenoxy, propargoxy, phenyloxy, toloxy, ethylphenoxy, toloxy, naphthoxy, methylnaphthoxy, benzoxy, phenylethoxy, phenylpropoxy, tolylethoxy, etc. The monovalent halohydrocarbonoxy radicals may be the same as the above oxyhydrocarbons, except methoxy and α-haloalkoxy radicals, where one or more of the hydrogens are replaced by a halogen, i.e., fluorine, chlorine, bromine, or iodine, to produce halohydrocarbonoxy radicals having at least two carbon atoms between the halogen and the free valence, a few typical examples of which are: 2-chloroethoxy, 2-bromoethoxy, 2-fluoroethoxy, 2,2-dichloroethoxy, 2- and 3-bromopropoxy, 2,2-difluoro-3-chloropropoxy, 2-, 3-, and 4-iodobutoxy, 2-, 3-, 4-, and 5-fluoroamoxy, 2-chlorovinoxy, 2- and 3-bromoalloxy, 2- and 3-fluoropropargoxy, mono-, di-, tri-, and tetrabromotoloxy, chloroethylphenoxy, ethylchlorophenoxy, iodoxyloxy, chloronaphthoxy, bromobenzoxy, chlorophenylethoxy, phenylchloroethoxy, bromotolylethoxy, etc.

Typical examples of polyphenylene oxides which may be employed in the process of this invention are:

poly-(2,6-dimethyl-1,4-phenylene)-oxide,
poly-(2,6-diethyl-1,4-phenylene)-oxide,
poly-(2,6-dibutyl-1,4-phenylene)-oxide,
poly-(2,6-dilauryl-1,4-phenylene)-oxide,
poly-(2,6-dipropyl-1,4-phenylene)-oxide,
poly-(2,6-dimethoxy-1,4-phenylene)-oxide,
poly-(2,6-diethoxy-1,4-phenylene)-oxide,
poly-(2-methoxy-6-ethoxy-1,4-phenylene)-oxide,
poly-[2,6-di-(chlorophenoxy)-1,4-phenylene]-oxide,
poly-[2,6-di-(chloroethyl)-1,4-phenylene]-oxide,
poly-(2-methyl-6-isobutyl-1,4-phenylene)-oxide,
poly-(2,6-ditolyl-1,4-phenylene)-oxide,
poly-[2,6-di-(chloropropyl)-1,4-phenylene]-oxide, etc.

The term "polyphenylene oxide" as used throughout this application refers to both the substituted and unsubstituted polyphenylene oxides.

The polyolefins which may be dispersed throughout the polyphenylene oxides include polyethylene, polypropylene, polyisopropylene, polyisobutylene, etc.

The method of dispersing the polyolefin in the polyphenylene oxide is not critical. The only requirement is that the polyolefin be homogeneously dispersed throughout the polyphenylene oxide. It is believed that with incomplete or nonhomogeneous dispersions, aggregates tend to form and impair the physical properties of the polyblend.

The dispersing operation may be carried out by any means known to those skilled in the art. For example, the dispersing operation may be carried out by mixing the two polymers in granular or powdered form in a Banbury mixer and/or roll mills or mixing may be carried out continuously by means of extrusion of a mixture of polymers. Another convenient method for forming the dispersion consists of dissolving the two polymers in a solvent in which they are mutually soluble and co-precipitating the polymers as a homogeneous mixture.

Extrusion has been found to be the preferred manner of blending the components according to this invention as this method was found to give the greatest degree of homogeneity.

In general, when forming the mixture by extrusion, the two polymers, in granular or powder form, are mixed by tumbling. The finer the powder, the greater the degree of homogeneity. The mixture is then fed to the hopper of an extrusion press and extruded at a temperature within the range of 450° to 650° F. In order to insure complete dispersion of the polyolefin in the polyphenylene oxide, it may be desirable to pelletize the extruded strand in a chopper and re-extrude under the same extrusion conditions.

In a preferred embodiment of this invention, I incorporate a plasticizer with the blend of polyolefin and polyphenylene oxide. The use of a plasticizer causes a dissolving or swelling of both polymeric components and thereby enhances mixing by reducing the friction between polymer particles. This prevents preferential association of regions of the same polymer. Generally, any plasticizer which is compatible with both polyolefins and polyphenylene oxide may be used. Typical examples of suitable plasticizers are the chlorinated biphenols, mineral oil, etc.

The amount of plasticizer should be kept at a level which will not unduly diminish properties of the polymer, i.e., rigidity, heat distortion, etc.

The amount of polyolefin which may be added to the polyphenylene oxide is that amount which is compatible with the polyphenylene oxide and does not segregate out into a separate phase. In general, I have found that I can incorporate up to approximately ten percent (10%) by weight polyolefin with polyphenylene oxide before incompatibility is noticed.

Above ten percent (10%), there is a tendency on the part of molded samples to delaminate and the composition begins to weaken. Particularly good results are obtained with additions of between three percent (3%) to five percent (5%) by weight polyolefin.

The following examples are illustrative of the process of my invention and the improved properties of polyphenylene oxides obtainable thereby:

EXAMPLE 1

This example illustrates the addition of polyethylene to poly-(2,6-dimethyl-1,4-phenylene)-oxide. Samples were prepared containing 0, .5%, 1%, 3%, 5%, and 10%, polyethylene. The samples were prepared by mixing granular poly-(2,6-dimethyl-1,4-phenylene)-oxide having an intrinsic viscosity of 0.54 dl./g. as measured in chloroform at 30° C. with granular polyethylene (Microthene 710 from U.S. Industrial Chemicals Co.) by tumbling on rollers for 30 minutes before extrusion. The respective mixtures were then passed through a hopper into the cylinder of a ¾" Wayne single screw extrusion press. Extrusion was carried out at a temperature of between 560° F. and 580° F. Following extrusion, samples were pelletized and again extruded under the same conditions. The extruded strands were injection molded at a temperature of between 590° F. and 610° F. to form a series of test bars measuring 2½" x ½" x ⅛". Both the impact strength and time to crack in hexane were measured for these samples. The impact strength was determined by the standards set forth in ASTM-D-256.

The resistance to an aggressive solvent was measured by bending the test bars until a 3% elongation occurred on the upper surface of the strained test bar. These strained test bars were locked in a four-point loading jig and immersed in hexane. The time necessary for these strained test bars to crack on the strained surface was measured. The results obtained from the above two tests are represented below in Table I:

Table I.—Properties of poly-(2,6-dimethylphenylene)-oxide-polyethylene compositions

| Composition, Wt. percent polyethylene in poly-(2,6-dimethylphenylene)-oxide | Impact strength, ft.-lb./in. notch | Time to crack at 3% elongation in hexane, mins. (average of 5 samples) |
| --- | --- | --- |
| 0 | 0.8 | 2-3 |
| 0.5 | 0.8 | 3-4 |
| 1 | 1.0 | 20-25 |
| 3 | 1.5 | *>500 |
| 5 | 2.1 | *>500 |
| 10 | 2.0 | 4-6 |

* The sample with 3% and 5% polyethylene did not crack in 500 minutes. The test was stopped at this point.

It was found that the polyethylene in amounts greater than 1% prevented the accumulation of blackened, oxidized material at the die of the extrusion press during fabrication. Also, during the injection molding operation of the 100% polyphenylene oxide, frequent application of a mold release agent was required. This was not necessary in any of the samples containing polyethylene.

EXAMPLE 2

Samples were prepared using the polyethylene, poly-(2,6-dimethyl-1,4-phenylene)-oxide and fabricating techniques of Example 1, the only difference being that 1% mineral oil plasticizer was added to the polymeric blend during the mixing operation. The results are shown below in Table II:

Table II.—Properties of polyblends of poly-(2,6-dimethyl-1,4-phenylene)-oxide and polyethylene with plasticizer inclusion Composition, wt. percent: Impact strength, ft. lb./in. notch
100% poly-(2,6-dimethyl-1,4-phenylene)-oxide _ 0.8
1% mineral oil in poly-(2,6-dimethyl-1,4-phenylene)-oxide _____ 0.8
5% polyethylene in poly-(2,6-dimethyl-1,4-phenylene)-oxide _____ 2.1
1% mineral oil and 5% polyethylene in poly-(2,6-dimethyl-1,4-phenylene)-oxide _____ 2.6

EXAMPLE 3

This example is designed to show that various other physical properties of polyphenylene oxide are not substantially impaired by inclusion of polyethylene. In this example, test bars as prepared in Example 1, were used to measure tensile strength, elongation to break, and heat distortion temperature. All tests were performed pursuant to ASTM standards.

Table III.—Properties of polyblends of poly-(2,6-dimethylphenylene)-oxide and polyethylene

| Composition, wt. percent polyethylene | Tensile strength, p.s.i. | | Elongation to break, percent | Heat distortion temp., °C. (264 p.s.i., 10 mil deflection) |
| --- | --- | --- | --- | --- |
| | Yield | Ultimate | | |
| 0 | 11,200 | 10,000 | 90 | 199 |
| 1 | 10,800 | 9,400 | 80 | 198 |
| 3 | 10,400 | 11,200 | 130 | 194 |
| 5 | 10,600 | 9,000 | 100 | 192 |
| 7.5 | ------ | 8,400 | 10 | 188 |
| 10 | ------ | 5,700 | 6 | 186 |

From the above table, it is apparent that the properties of the blend are not substantially affected with additions of up to 5% polyethylene.

EXAMPLE 4

In this example, blends of 3 weight percent polypropylene with poly-(2,6-dimethyl-1,4-phenylene)-oxide having an intrinsic viscosity of 0.54 dl./g. as measured in chloroform at 30° C. were formulated into test bars measuring 2½" x ½" x ⅛" in a manner similar to that of Example 1. The polypropylene was Avisun Type #1044, sustained heat grade, having a density of 0.91. To demonstrate the necessity for homogeneously dispersing the polyolefin in the polyphenylene oxide, two different groups of samples were prepared. The first series of test bars were formulated by blending pellets of polypropylene with polyphenylene oxide, extruding at a temperature between 560° F. and 580° F., pelletizing the extruded strand and re-extruding under the same conditions. The extrusion press was the same press utilized in Example 1. Following extrusion, the extruded strand was injection-molded at a temperature varying between 610° F. and 640° F.

The second series of test bars were formulated using the same polymers and fabricating techniques as above, but substituting powdered polypropylene for the granular polypropylene. The powdered polypropylene was obtained by dissolving granular polypropylene in hot xylene, blending in a Waring Blendor, and precipitating with methanol. The precipitated powder was then dried in a circulating air oven at 100° C. and finally separated on a 20-mesh screen. The friction passing the 20-mesh screen was used to form the test bars by the same procedure employed above. The following results were obtained:

Table VI.—Properties of poly-(2,6-dimethylphenylene)-oxide and polypropylene

| Wt. percent polypropylene in poly-(2,6-dimethylphenylene)-oxide | Polypropylene blended as— | Impact strength, ft.-lb./in. notch |
|---|---|---|
| 0 | ---------- | 0.8 |
| 3 | Pellets | 1.4 |
| 3 | Powder | 1.6 |

EXAMPLE 5

In this example, the same procedure was employed as in Example 5 except that Avisun Type #3211 high-impact grade polypropylene having a specific weight of 0.91 was used. Again the effects of dispersion of the polypropylene were observed by comparing the results obtainable with pelletized polypropylenes and powdered polypropylenes passing a 20-mesh screen. The results obtained can be seen from the following table:

Table V.—Properties of poly-(2,6-dimethylphenylene)-oxide and polypropylene

| Wt. percent polypropylene in poly-(2,6-dimethylphenylene)-oxide | Polypropylene blended as— | Impact strength, ft.-lb./in. notch |
|---|---|---|
| 0 | ---------- | 0.8 |
| 3 | Pellets | 2.1 |
| 3 | Powders | 2.4 |
| 5 | Powders | 2.1 |

EXAMPLE 6

In this example an ethylene-propylene copolymer was swollen in hot toluene and mixed with methanol in a Waring Blendor to precipitate a polymer powder. The solution formed was mixed with methanol to precipitate a mixed polymer powder of polypropylene and polyethylene. The precipitated powder was dried and screened with a 20-mesh screen in a manner similar to that described in Example 5. The poly-(2,6-dimethyl-1,4-phenylene)-oxide of Example 5 was then added to the powdered ethylene-polypropylene copolymer to give a composition containing 3 weight percent polyolefin in the polyphenylene oxide. This polyblend was then tumbled for one-half hour and extruded in the same manner as in Example 1. The extrusion temperature was maintained between 550° F. and 570° F. The extruded strands were then chopped, and re-extruded under the same extrusion conditions. The resultant extruded strands were injection-molded at a temperature of between 580° F. and 600° F. to give test bars measuring 2½" x ½" x ⅛". The samples obtained were homogeneous in appearance and there was no evidence of delamination. The test bars measured 1.7 per lbs./inch notch impact strength as opposed to 1.1 per lbs./inch notch impact strength of a sample consisting of 100% polyphenylene oxide.

It should, of course, be apparent to those skilled in the art that changes may be made in the particular embodiments of the invention described which are within the full intended scope of the invention as defined by the appended claims. For example, additional materials may be added to the polymeric composition. Thus, it is within the full scope of the disclosure to add materials such as pigments, i.e., titanium dioxide, tints, stabilizers, etc.

What I claim as new and desire to secure by Letters Patent of the United States is:

1. A polymer composition having high impact strength and good resistance to aggressive solvent attack comprising a blend of a polyolefin and a polyphenylene oxide having a general formula:

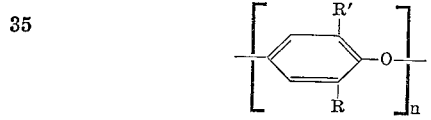

where R is a monovalent substituent selected from the group consisting of hydrogen, hydrocarbon radicals free of a tertiary alpha-carbon atom, halohydrocarbon radicals having at least two carbon atoms between the halogen atom and phenol nucleus and being free of a tertiary alpha-carbon atom, hydrocarbonoxy radicals free of a tertiary alpha-carbon and halohydrocarbonoxy radicals having at least two carbon atoms between the halogen atom and phenol nucleus and being free of tertiary alpha-carbon atom; R' is the same as R and, in addition, halogen; and $n$ may represent any whole integer greater than 100, said polyolefin comprising from 1% to 10% by weight of the total composition.

2. The composition of claim 1 wherein R and R' are both methyl groups.

3. The composition of claim 2 wherein the polyolefin is polypropylene and constitutes 3% by weight of the total composition.

4. The composition of claim 2 wherein the polyolefin is polyethylene and constitutes 3% by weight of the total composition.

5. The composition of claim 2 including 25% by weight of an organic plasticizer.

6. The composition of claim 5 where the plasticizer is mineral oil.

No references cited.

SAMUEL H. BLECH, *Primary Examiner.*

D. J. BREZNER, *Assistant Examiner.*